United States Patent [19]
Stewart

[11] 3,850,448
[45] Nov. 26, 1974

[54] PRESSURIZED DRIVING MECHANISM

[76] Inventor: George A. Stewart, R.D. No. 2, Branchville, N.J. 07826

[22] Filed: July 13, 1972

[21] Appl. No.: 271,540

[52] U.S. Cl. .............................................. 280/216
[51] Int. Cl. ............................................. B62m 1/10
[58] Field of Search........ 280/216; 188/24.07, 66 C, 188/66 F

[56] References Cited
UNITED STATES PATENTS

| 576,538 | 2/1897 | Bellamy | 280/216 |
| 2,144,538 | 1/1939 | Kaskell | 280/216 |
| 2,177,381 | 10/1939 | Bichi | 280/216 |
| 2,539,490 | 1/1951 | Smith | 188/66 |

FOREIGN PATENTS OR APPLICATIONS

| 1,050,228 | 1/1954 | France | 280/216 |
| 817,538 | 7/1959 | Great Britain | 280/216 |

*Primary Examiner*—Allen N. Knowles

[57] ABSTRACT

This invention can be used in cycle type vehicles but it is not restricted to such vehicles. It utilizes an internal liquid belt that is hydraulically energized by a pump means which is bodily driven. The pump means creates a pressurized force against extremities which can be wheels, but are not limited to wheels. The invention also utilizes a directional chamber means that enables the pressurized fluid to be transported through the internal portion of the extremity or wheel supports in such a way as to allow for a steering capability of 360° and a balanced dual thrust effect on the driving means of the extremities or wheels. The combination of the pump means and the directional chamber means allows for a reverse as well as a forward action and also a coasting and braking action.

9 Claims, 38 Drawing Figures

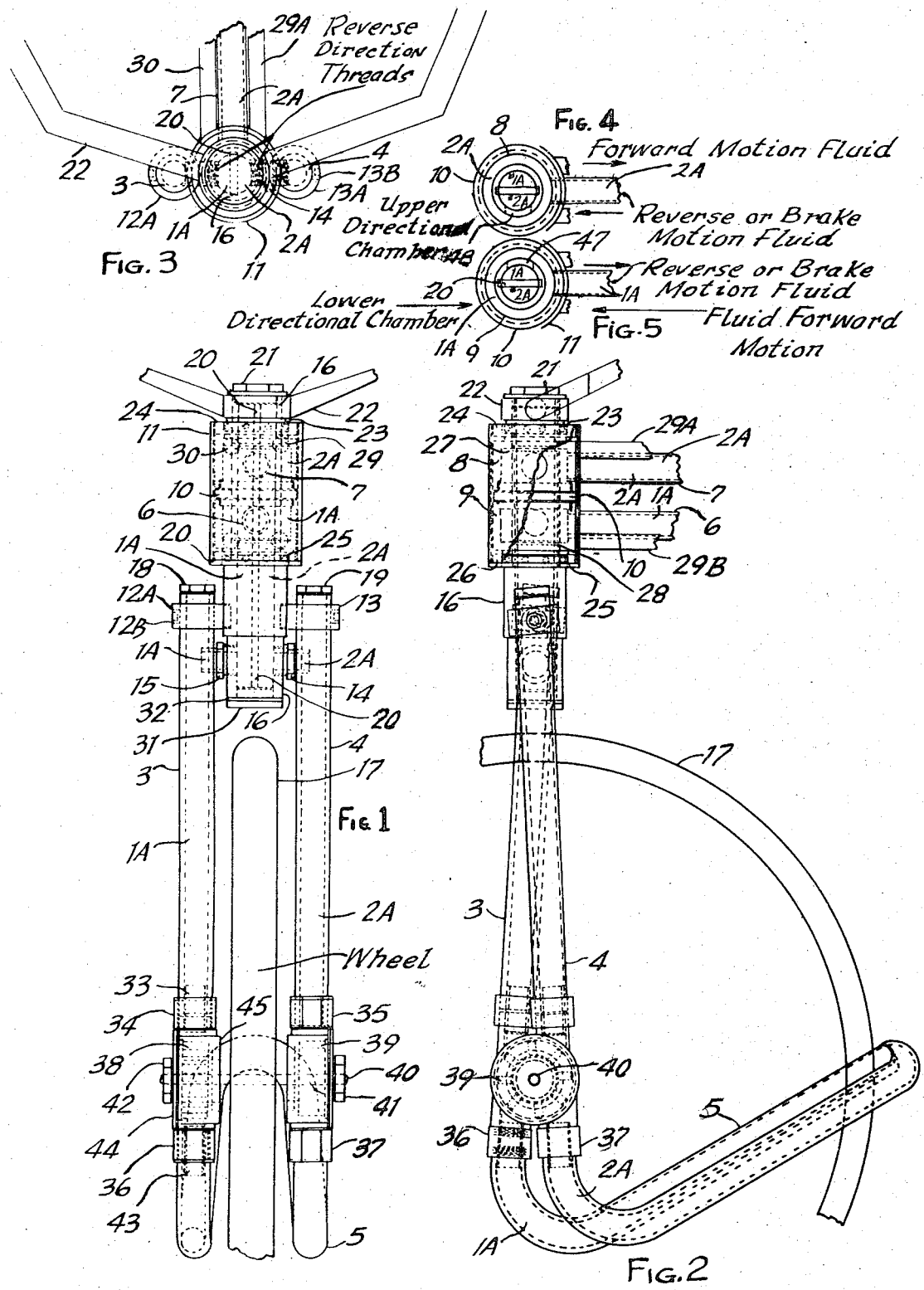

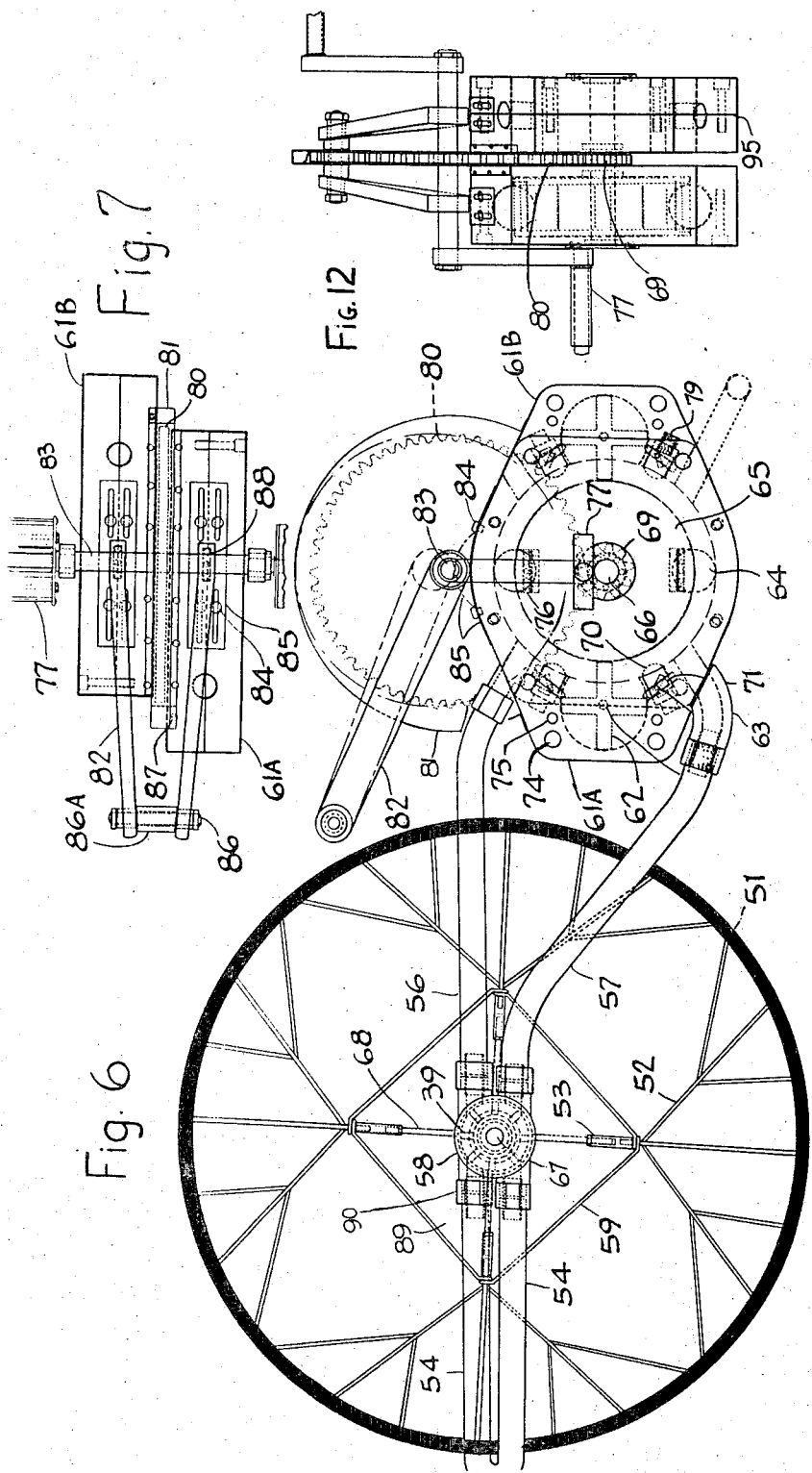

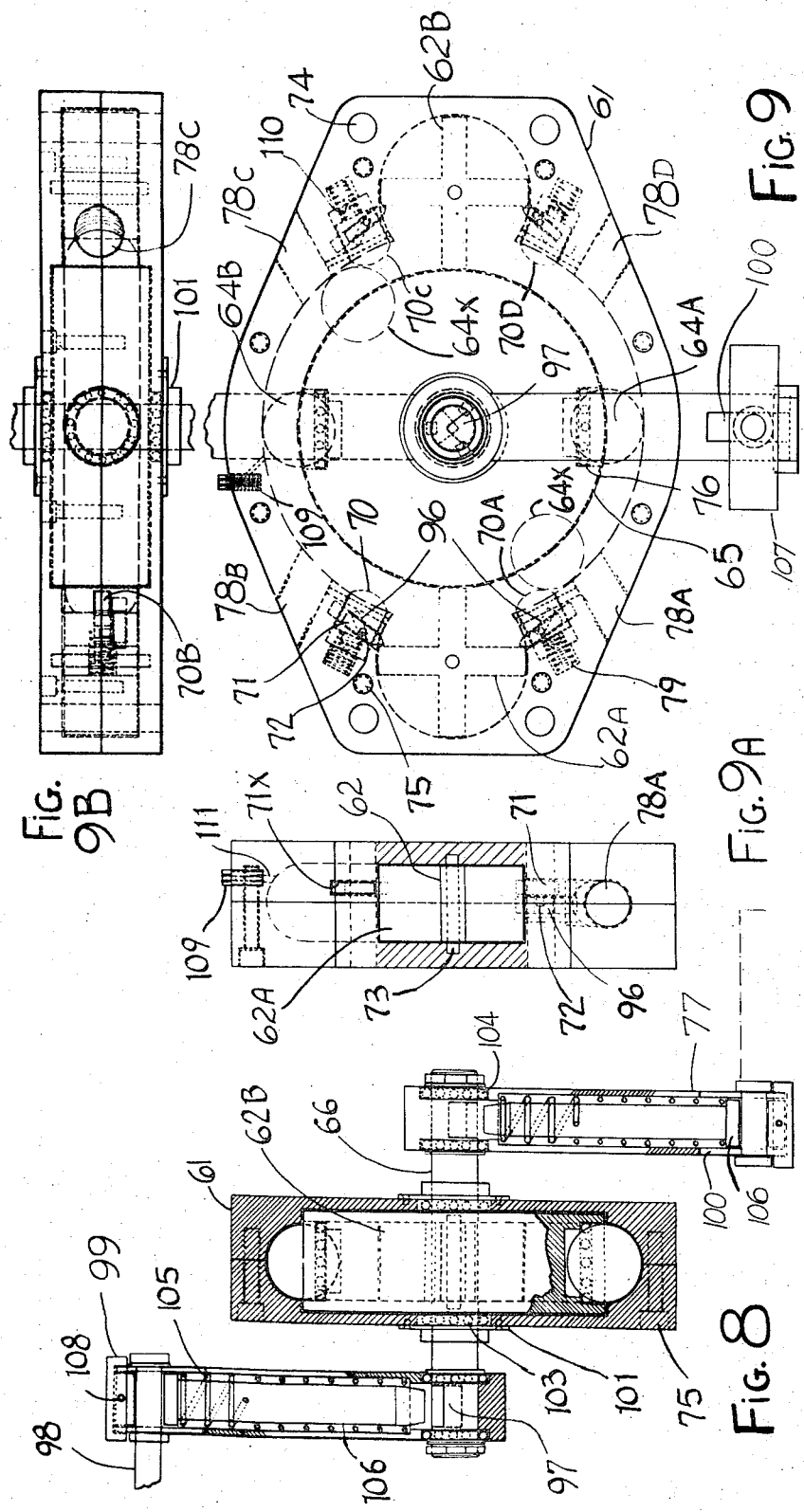

PATENTED NOV 26 1974
3,850,448
SHEET 5 OF 7
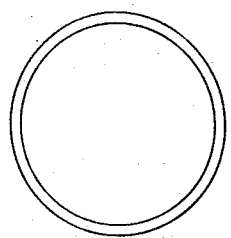
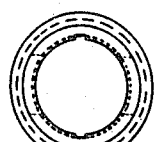
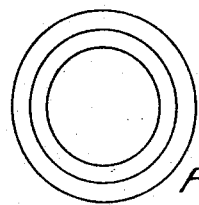
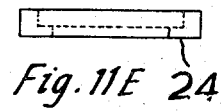
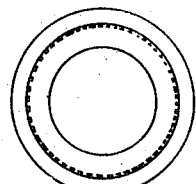
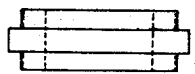
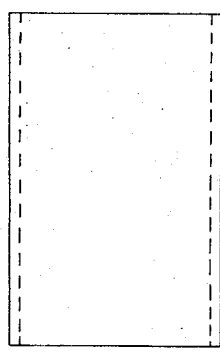

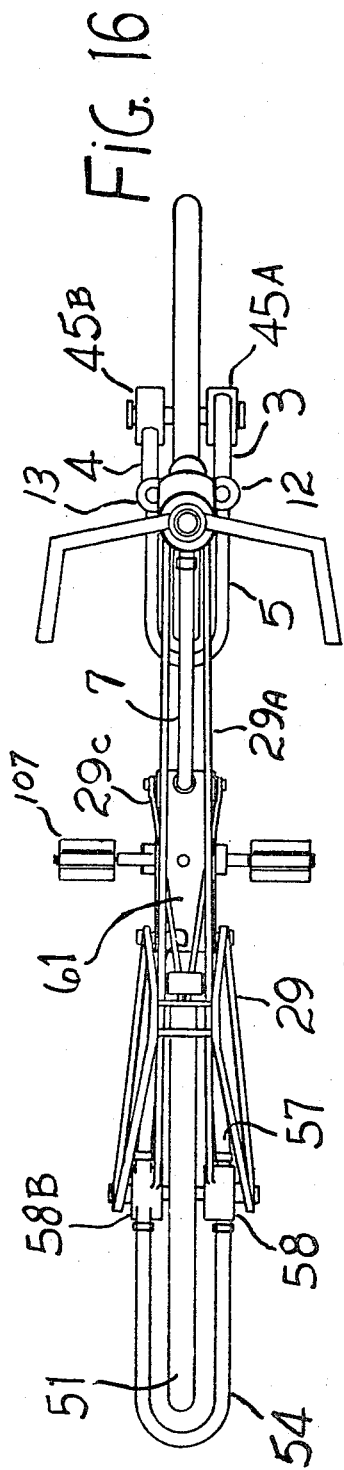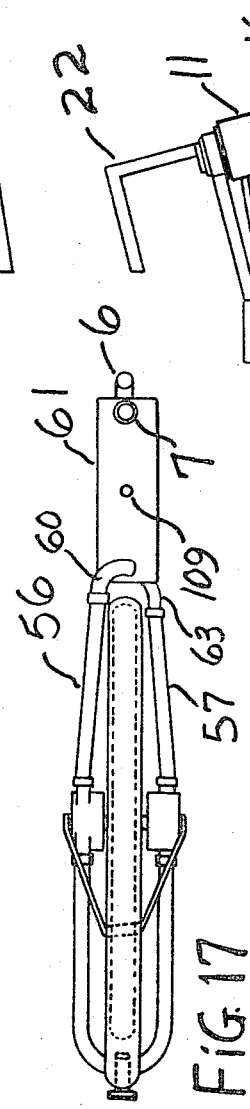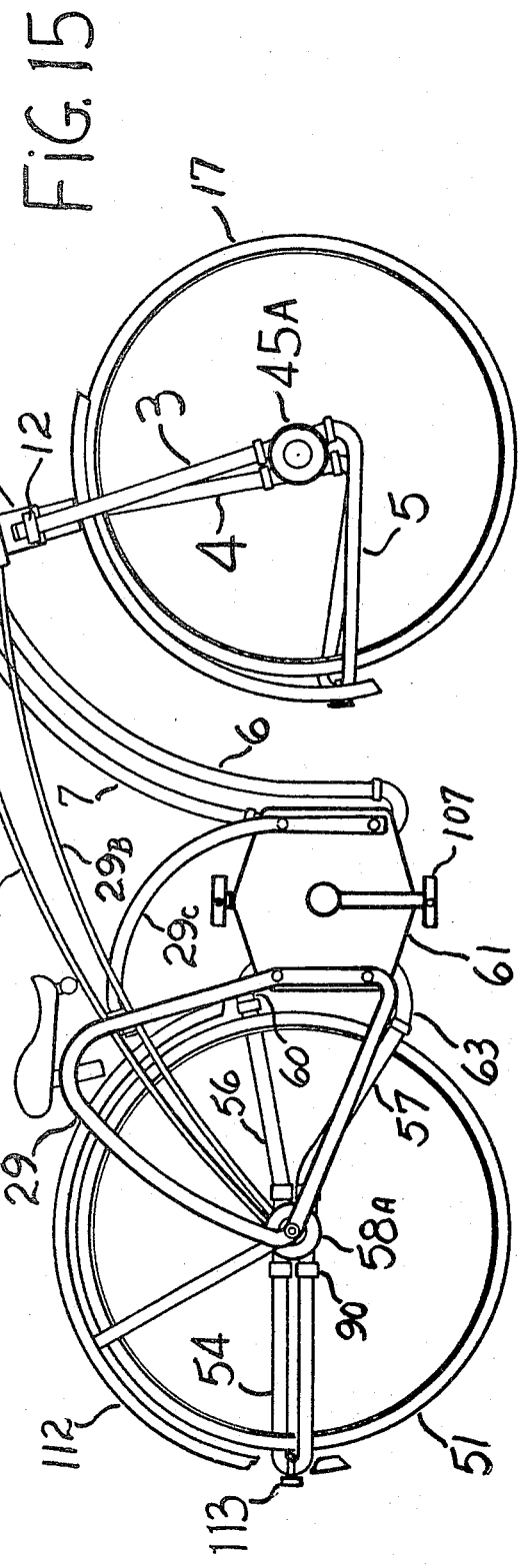

PRESSURIZED DRIVING MECHANISM

The purpose of this invention is to create a vehicle that can be bodily powered without the aid of a combustion motor, thus eliminating air pollution being readily usable under emergency conditions, and being economical. Such a vehicle could transport, with ease, persons of varying weights over flat, hilly or rough terrain. Such a vehicle could be a bicycle, but it is not restricted to a bicycle. This vehicle would have both rear and front wheel drive, eliminating the present day chains, and would be propelled through internal pressures by the use of a liquid.

The varying methods of manufacture that could be used would allow greater movement using less effort than present vehicles now require. Most important to persons of all ages is the reduction in the effort required to climb steep hills. The present day bicycle restricts travel somewhat and has increased the necessity of gas burning engines in this country. This, new vehicle would be more versatile than present day cycles because it could go in reverse, as well as forward instantaneously. No gear shifting is required. A greater and truer braking power would be possible. This vehicle would have the ability to travel over rough terrain due to multi-wheel drive, where the present day bicycle can not. It is known that liquid propulsion has been conceived at much earlier dates, but in all instances it is in conjunction with a high speed driving motor, and used on weighty vehicles. However, I feel that the method and design I am using, which allows a reciprocal free flow as well as a pressure assistance, when used in very light vehicles, will make it possible to get maximum results with neither excessive heat nor pressure build up and will include, the ability to turn the front wheel 360°, while it it is being driven, without loss of driving power to the front wheel. The simplicity of this design eliminates the need for any shifting levers for forward, reverse, speed changes or coasting, all of which can be easily controlled by foot or hand pressure depending on how the vehicle is being propelled by the rider.

The following descriptions refer to the drawings, included herein:

FIG. 1 is a front view of the combination front wheel support, and hydraulic fluid conveying pipes as well as input and output chambers.

FIG. 2 is a side view of the same showing the wheel impeller and a small portion of the main frame supports and fluid conveying pipes.

FIG. 3 shows a top view of supporting members.

FIGS. 4 and 5 show the directional chambers and direction of fluid flow for vehicle motion.

FIG. 6 shows a combination of a rear wheel impeller, a housing, and fluid conveying pipes and supports, as well as an alternate to the common spoke.

FIG. 7 shows a single wheel pressure pump used in tandem that conveys fluid through pipes to wheel impellers. This single unit can be used in tandem where exceptional drive power is desired, using a gear drive to multiply the driving power.

FIG. 8 is a dual pressure pump that supplies fluid to both front and rear wheels simultaneously which is cross-sectioned for internal view.

FIG. 9A is an end view of FIG. 9 showing the stop gate baffle used in this particular type pump.

FIG. 9B is a top view of FIG. 9.

FIGS. 11A–11U are a breakdown in detail, of the front wheel drive directional unit. This as well as the pump are the basic invention.

FIG. 12 shows the pressure pumps in tandem using a gear for additional acceleration which could be used on larger multi-wheeled vehicles.

FIG. 15 is a side view of a bicycle showing the application of a hydraulic power transmitting mechanism.

With continued reference to the drawings, the bicycle has a frame generally indicated in FIGS. 15 and 16 and 17 using a conventional seat and wheels [17 and 51]. The spokes are not shown in the wheels for greater clarity. The general construction of the bicycle frame may be entirely conventional and constitutes no part of the present invention claimed, except in combination with the hydraulic power transmitting mechanism hereinafter described. A hydraulic fluid transmitting pump [61] is mounted on the frame [29, 29a, 29b, 29c of FIGS. 15 and 16;] with fluid transmitting pipes [60, 56, 63, and 59] extending out of the pump to the rear wheel impeller housing [58a and 58b of FIGS. 15, 16 and 17] fluid transmitting pipes [6 and 7] extending out of the pump to the frame [11] of the front wheel [FIGS. 15 and 16] a fluid transmission pipe, [54 on FIGS. 15 and 16] extending from one rear wheel impeller housing [58a] to the opposite impeller housing [58b] on the rear wheel, and a fluid transmission pipe [5 on FIGS. 15 and 16] from one front wheel impeller housing [45a] to the opposite impeller housing [45b] on the front wheel. There are also fluid transmission pipes [3 and 4 of FIGS. 15 and 16] from the steering column [16] to the impeller housings [45a & 45b] on the front wheel which also serve as wheel supports [16] an integral part of the frame using a ring-type brace [12].

A filling and ventilating plug [109 FIG. 17] will serve as a heat expansion plug if required. A directional fluid separation unit, [16 on FIG. 15] will serve as part of the steering mechanism, and is shown in more detail in FIGS. 1 and 2, and 10 and 11.

Figure 10:
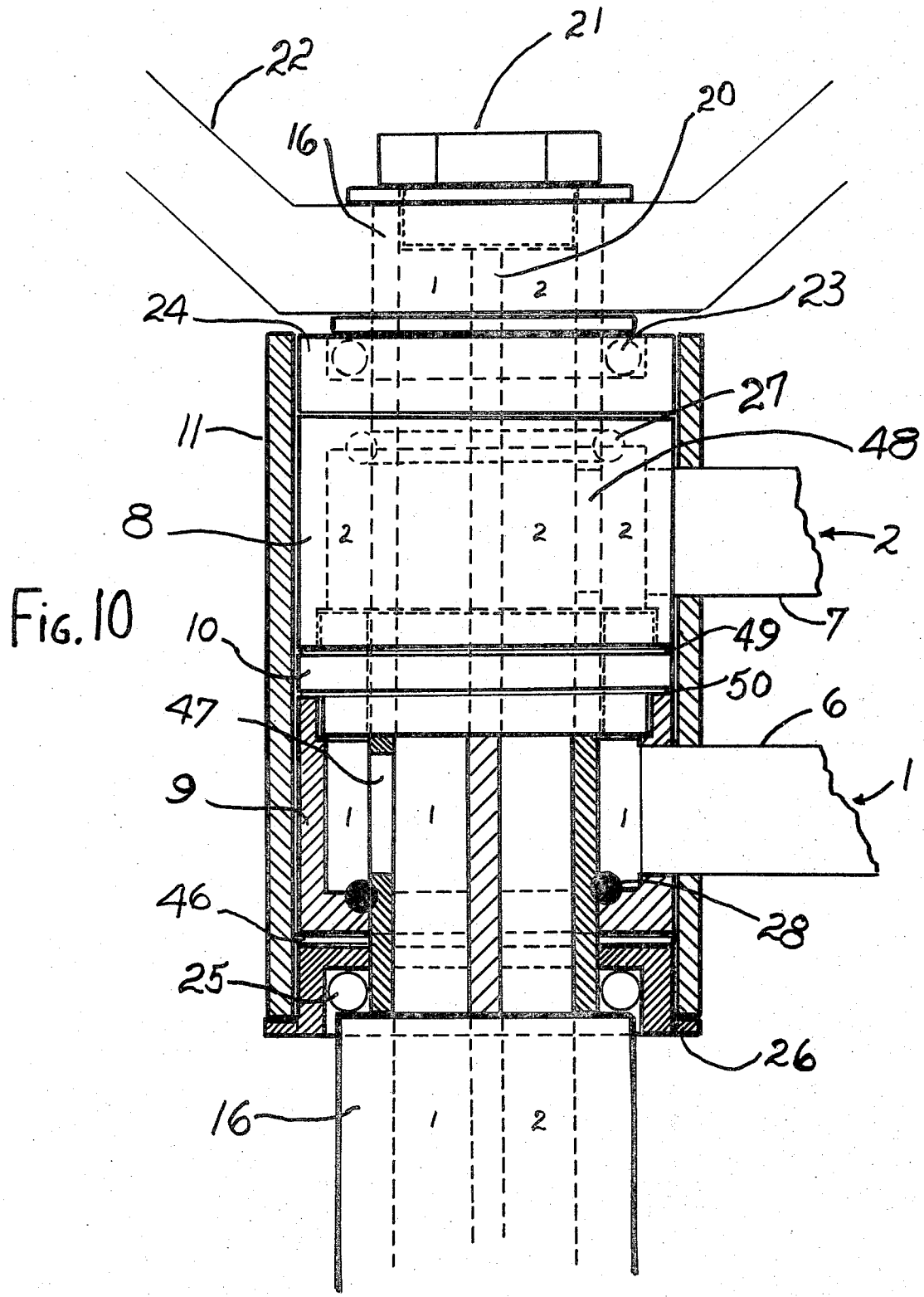
FIG. 10 is a view of the directional chamber or front wheel drive unit.
Figure 13:
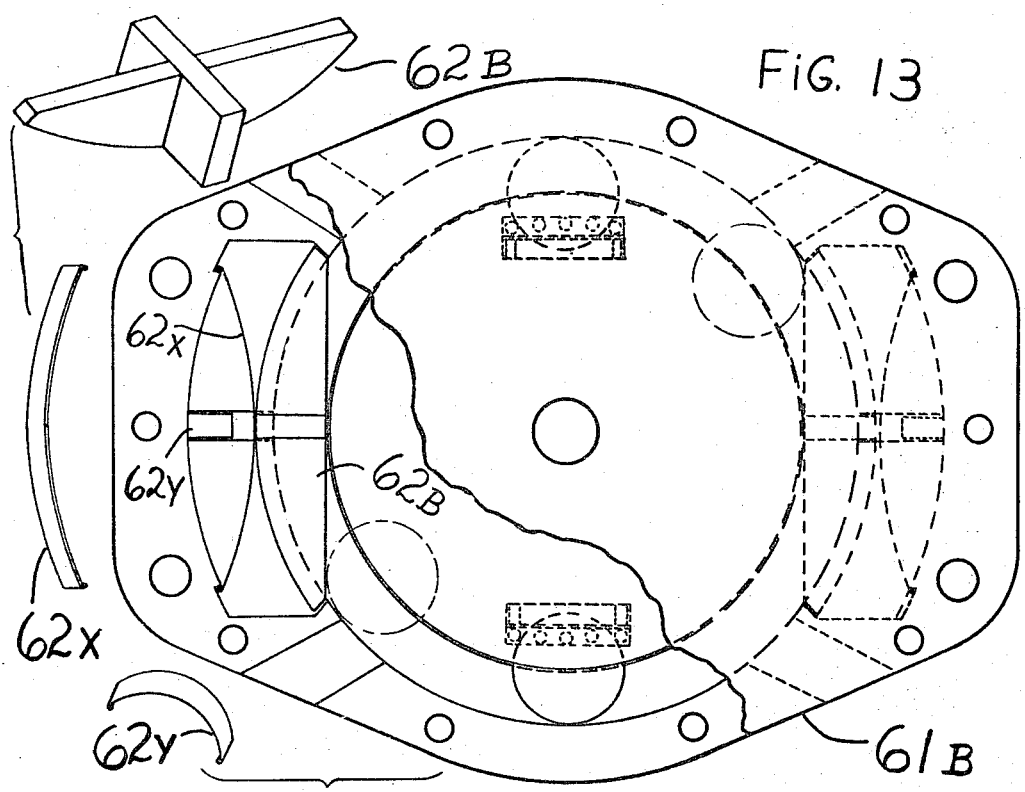
FIG. 13 is a partially cut away view showing a variation of the pressure pumps that may be used with a different stop gate baffle.

An outer casing [11 FIG. 15] is used as part of the bicycle frame; it is shown in detail in FIGS. 10 and 11. Couplings [90 FIG. 15] are used for joining fluid transmission pipes to the impeller housing.

A pump [9A] having a revolvable gate baffle [62, 62a and 73] is used to prevent passage of fluid past a certain point. FIG. 9 is a full face view. FIG. 9B is a top view. Fluid driving ball bearings [64a and 64b FIG. 9] are the means of forcing fluid through a passageway [78] FIG. 9 shows the path of travel of the ball bearing through the fluid passageway [78] where it makes contact with a release button [70a] on the slide rod [71] that is holding the gate baffle [62a]. A spring [79] returns the slide rod to a holding position as soon as the ball bearing [64a] has passed over the release button [70a].

A slot [9B of FIG. 9] is cut out in the release buttons [70a, b, c, d], and receives the slide rod pin [72, FIG. 9, 9A].

Parts [78a, b, c, d FIG. 9] are used through which fluid is forced, by travel of ball bearings in the passageway, into pipes that transmit the fluid to the front and rear wheel impeller housings. A trapped air release valve [109 FIG. 9] allows for possible fluid expansion if necessary.

Support holes [74 FIG. 9] are used for bolting the pump to the bicycle frame. Studs [75 FIG. 9] are used to clamp both sides of the pump casing together. 77 FIG. 9B is a gasket between the two sides of the pump casing, [61] 101 FIG. 9B is an oil seal.

A fluid driving ball bearing hub or drum [65 FIG. 9] retains the ball bearing [64a and 64b and as shown in FIG. 8] and is supported on the foot pedal shaft or axle [66] in the pump casing [61] bearings [103] A supporting member [73 FIG. 9A] is used upon which the gate baffle [62] rotates. A bearing race [76 FIG. 9] under the main fluid driving ball bearing [64a] allows free motion and minimum wear of the fluid driving ball bearings [64a and 64b] and the fluid chamber [78].

There are either inlet or outlet ports [78d and 78c FIG. 9] from the pump [61] fluid chamber [78] and depending upon the direction in which the bicycle is being propelled they supply fluid to the front wheel drive impellers [38, 39 FIG. 1]. In referring to FIGS. 1, 2, 3, 4, 5 — it would be helpful to also refer to FIGS. 10 and 11 for a more detailed and enlarged view.

A supporting bearing [26 FIGS. 2, 10, 11] plus the upper and lower directional chamber reservoirs [8, 9, FIGS. 10, 11] joined together by a reservoir separator flange [10 FIGS. 10, 11] are all mounted on the separator shaft or steering column [16 FIGS. 10, 11] and are supported inside the outer casing [11 FIGS. 1, 3, 10, 11] which is part of the frame of the bicycle. An O-type ring washer [27 and 28 FIGS. 10, 11] may be used on the steering column [16 FIGS. 10, 11] to prevent leakage.

Fluid passes through the uppermost pipe [7 FIGS. 3, 10] continues through the upper directional chamber orifice [2 FIGS. 10, 2A FIGS. 2, 3, 4] into the upper directional chamber reservoir [8 FIGS. 4, 10, 11] then continues out of the upper directional chamber reservoir [8] by way of an upper orifice [48 FIGS. 4, 10 and 16 FIG. 11] in a hollow separation shaft [16 FIGS. 1, 2, 10, 11] which is the steering column and an integral part of the frame. There is a separator [20 FIGS. 1, 10, 11] centered inside the hollow separation shaft to create two individual passages for the pressurized fluid flow through the separator shaft to the fluid transmission pipes [3 and 4 FIGS. 1, 2].

The steering column [16] also serves as a retainer and a support for the fluid transmission pipes [3 and 4] that extend between the steering column on the separator shaft [16] and the front wheel impeller housings [45, FIG. 1]. The passageway of the power transmission fluid passes through [12a FIG. 1] a reverse threaded connector [14 FIGS. 1 and 3] located between the steering column [16] and fluid transmission pipe [4] then through the coupling [35] into the impeller housing [45 FIG. 2] and through the impeller housing turning the impeller [39] 180°, then out of the housing [45] and through the coupling [37] in the fluid transmission pipe [5 FIGS. 1 and 2].

The power fluid transmission returns to the pump through a coupling [36 FIGS. 1 and 2]. There is a sleeve [43] inside the fluid transmission pipes, the impeller housings, and inside the couplings to prevent leakage. Fluid continues into the impeller housing [45] turning the impeller [38] 180°, then goes out through a fluid transmission pipe [3] up through a reverse threaded connector [15] up through the steering column on the left side of the separator [20 FIGS. 11, 10, 1] then through the orifice [47 FIGS. 5, 11, 10] in the steering column [16] into the lower directional chamber reservoir [9, FIG. 10] out the orifice of the directional chamber [6a] into a fluid transmission pipe [6 FIG. 2] and down to the pump housing [16 FIG. 15] or into the pump port [78d FIG. 9].

In explaining the passage of fluid through the impeller housing [45a and 45b FIG. 16] a turning of 180° was mentioned, however the flow of fluid is constant or continues until a braking action takes place. Consequently, there is a 360° rotation of the impeller which should be of smooth action, as there is an internal fluid belt or fluid chain that is constant.

While the path of the passageway of fluid is being completed from the pump to the front wheel and back to the pump, a similar path of the passageway of power transmission fluid is in progress from the pump to the rear wheel FIG. 6 and back to the pump FIG. 12. There is therefore a continuous pressurized flow of fluid from front to rear wheel and from rear to front wheel having equalized pressures at front and rear wheel alike.

Figure 14:
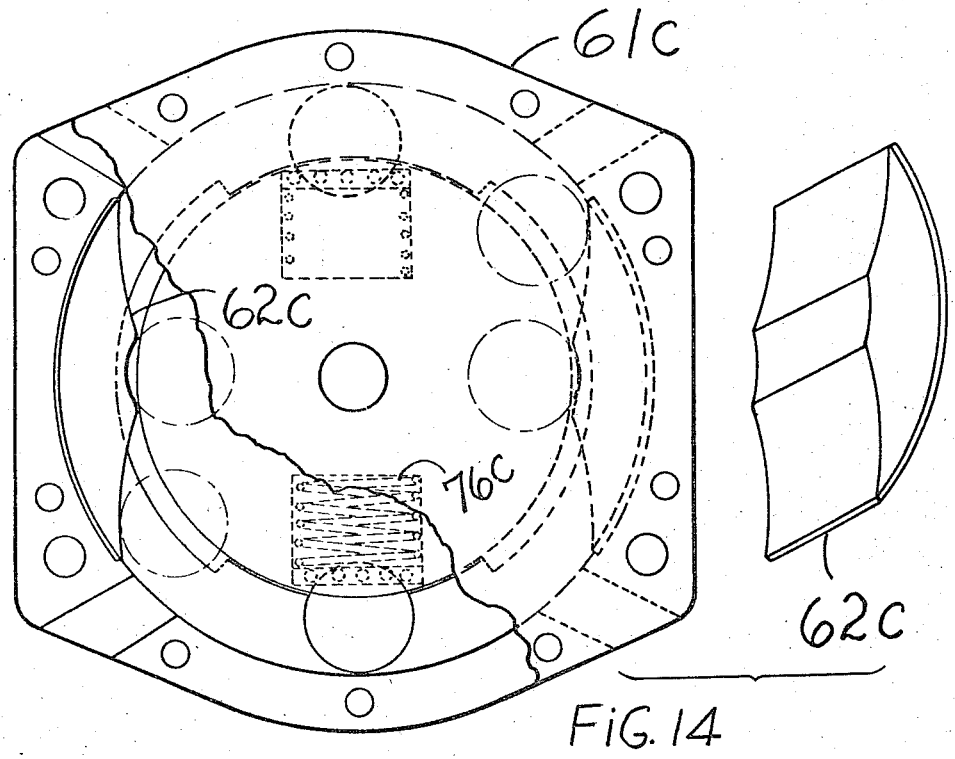
FIG. 14 shows still another variation of the pressure pump using a solid or stationary stop gate baffle and a depressable fluid driving ball bearing as well as a larger fluid chamber, and a more compact unit.

By positioning the fluid drive bearings between 70a and 70b on one side and 70c and 70d on the opposite side at the gate baffle location [62 of FIG. 9 and 62c FIG. 14] coasting can be accomplished. No pumping is taking place in the pump [FIG 9] but a reciprocal action takes place and the wheel impellers, being turned by the movement of the wheels, serve as secondary pumps, pumping an uninterrupted flow of fluid through the main pump from one wheel to the other in a continuous flow. A slight back pressure will slow down the flow of fluid through the pump and reduce the momentum of the bicycle, a forceful back pressure will stop the flow or change the direction of flow of fluid causing a dfinite brake action that would stop the bicycle or, if desired, reverse the direction of movement.

Ordinary bicycle spokes may be used on the rear wheel [16] in preference to that which is shown. [56 and 57 FIGS. 6 and 12] are power transmission fluid pipes, as is [5] [39] is an impeller, [58] is the housing. Fluid flows out of the pump through an adapter [63] then up through a pipe [57] into the impeller housing [58] turning the impeller [39] then out of impeller housing [58] into a fluid transmission pipe [54] around and through a coupling sleeve [89] into the opposite impeller housing turning the impeller, then out of the impeller housing into fluid transmission pipe [56] and back into the upper portion of the pump [61].

It is possible to use this system to drive each wheel independently or to drive four wheels using a gear arrangement to gain more drive power [FIG. 12]. There is a gear [80] a gear cover [81] a pedal [77] a pedal shaft [83] a gear support [82] a frame connecting shaft [86] a disengaging spring [85] a pedal shaft bearing [82] in a gear support bracket [82] pins [84] on which a spring slides when depressed, a pump casing 1 [[61a] and a pump casing No. 2 [61b]. Both pumps are driven simultaneously by gears [80 and 69]. There also is a gear [69] on the pump's drive shaft [66].

What I claim is:

1. In a fluid transmission apparatus, the combination of a bodily operated rotary pump means that supplies pressurized driving power to a distantly located rotary means, which are driven thereby, and which have the ability to allow pressurized fluid to by-pass the pressurizing mechanism, allowing for a reciprocal action of constantly flowing drive fluid for a period of time a fluid driven rotary element said bodily operated rotary pump means having a plurality of ports that convey pressurized fluid to and from said fluid driven rotating element and further including a pressurized fluid control means in a pressurized fluid circuit which makes it possible to turn said fluid driven rotating element 360° in a steering manner.

2. An apparatus as in claim 1 further including a bicycle, wherein the fluid driven rotating element is one of the wheels of said bicycle, and said fluid transmission apparatus is connected in such a manner as to be capable of driving both wheels of said bicycles simultaneously without any loss of steering ability.

3. An apparatus as in claim 1 wherein the fluid transmission apparatus is located internally in a vehicle and is coupled to said driven rotating mans in such a manner that it is capable of causing continuous movement of said vehicle, when pressurized, and permits the driven rotating means to turn in a steering manner.

4. An apparatus as in claim 1 wherein the rotary pump means includes, a fluid power transmitting pump having two inlets, two outlets, and two stop gate baffles is capable of pressurizing fluid in a forward or reverse manner, and said apparatus further including a separator column means having a set of chambers used as reservoirs for fluid transmission through orifices of separated passages, and is capable of controlling the direction and path of pressurized fluid flow.

5. An apparatus as in claim 1, further including a wheeled vehicle, at least one of said wheels being mounted for steering movement, wherein said rotary pump means is connected for delivering fluid pressure driving power to all wheels of said vehicle simultaneously, and further including a means of transmitting such power to said steerable wheels, such means being a set of chambers in a separator shaft each having orifices to direct fluid to a desired path to 360° steerable extremities.

6. An apparatus as in claim 1 wherein the pump means is of a fluid transmitting type integral with fluid conveying pipes, and a directional chamber means, said directional chamber means permits the guidance of pressurized fluid through said fluid conveying pipes, said pipes connected to and supporting said driven rotating element in a steering manner.

7. An apparatus as in claim 1 and further including a fluid guidance means that consists of a plurality of chambers integral with a shaft-type column having a separator bar having orifices located in such a manner as to allow a controlled flow of pressurized fluid in a desired direction and is capable of accomplishing a free steering action on said driven rotating element.

8. An apparatus as in claim 1, further including a lightweight vehicle having at least two mobile propelling means, wherein the fluid transmission apparatus is connected in such a manner as to supply driving power to all propelling means while simultaneously permitting complete steering movement of 360° at any such propelling means.

9. An apparatus as in claim 1 further including wheel means, the fluid transmission apparatus connected to said wheel means in such a manner that the fluid pressure generated by said pump means, when transmitted to said wheel means, is capable of directing to each side of the wheel means a balanced dual thrust effect on said wheel means.

* * * * *